(12) United States Patent
Saito

(10) Patent No.: US 7,596,168 B2
(45) Date of Patent: Sep. 29, 2009

(54) DIVERSITY RECEIVING APPARATUS, CONTROLLING METHOD OF THE SAME, AND COMPUTER-READABLE MEDIUM CONTAINING PROGRAM THEREFOR

(75) Inventor: Yasuji Saito, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 564 days.

(21) Appl. No.: 11/457,224

(22) Filed: Jul. 13, 2006

(65) Prior Publication Data
US 2007/0014386 A1 Jan. 18, 2007

(30) Foreign Application Priority Data
Jul. 14, 2005 (JP) ............................. 2005-206078

(51) Int. Cl.
*H04B 1/00* (2006.01)
(52) U.S. Cl. ................. 375/140; 375/142; 375/150; 375/267; 375/343
(58) Field of Classification Search ................. 375/140, 375/142, 150, 267, 343, 347, 260; 370/203–311
See application file for complete search history.

(56) References Cited

U.S. PATENT DOCUMENTS

2002/0048261 A1* 4/2002 Brioschi et al. ............. 370/252

2002/0181627 A1* 12/2002 Wengler ...................... 375/347

FOREIGN PATENT DOCUMENTS

JP    2000-252895    9/2000

* cited by examiner

*Primary Examiner*—Curtis B Odom
(74) *Attorney, Agent, or Firm*—SoCal IP Law Group LLP; Steven C. Sereboff; John E. Gunther

(57) ABSTRACT

A diversity receiving apparatus receives first and second reception signals and is constituted by including one or more phase shifters that generate one or more third signals having phases different from the second reception signal based on the second reception signal, a correlation calculator that obtains a correlation between the first reception signal and each of the second reception signal and the third reception signals, a correlation comparator that selects the reception signal having the highest correlation with the first reception signal from the second reception signal and the third reception signals, a selector that selects and outputs the second reception signal or the third reception signal selected by the correlation comparator; and a combining device that outputs a signal formed by combining the first reception signal and the reception signal output from the selector.

7 Claims, 10 Drawing Sheets

US 7,596,168 B2

DIVERSITY RECEIVING APPARATUS, CONTROLLING METHOD OF THE SAME, AND COMPUTER-READABLE MEDIUM CONTAINING PROGRAM THEREFOR

CROSS-REFERENCE TO RELATED APPLICATIONS

This application claims priority from Japanese Patent Application No. 2005-206078 filed on Jul. 14, 2005, which is herein incorporated by reference.

BACKGROUND OF THE INVENTION

1. Field of the Invention

The present invention relates to a diversity receiving apparatus, a controlling method of a diversity receiving apparatus, and a program that are used in an on-vehicle antenna or cellular phone and to technology that supplies stable reception signals with a simple configuration.

2. Description of the Related Art

Japanese Patent Application Laid-Open Publication No. 2000-252895 discloses a TV diversity system including: a combining section that shifts a phase of a reception signal of at least one TV antenna of a plurality of TV antennas with a plurality of phase shifters by mutually different shift amounts and combine an output signal of each phase shifter with an output signal from another TV antenna; and a reception signal changeover section that compares a plurality of the combined reception signals combined by the combining section with a reception signal outputted from the TV antenna, or compare a plurality of the combined reception signals, select the reception signal at the highest level, and transmit the signal to a television receiver.

FIG. 6 shows an on-vehicle TV diversity system including a plurality of TV antennas 61, a plurality of amplification circuits (amplifiers) 62, a plurality of phase shifters 31, a plurality of combining devices 41, a reception signal changeover switch 51, a level comparison circuit 71, etc. In this system, the level comparison circuit 71 switches the reception signal changeover switch 51 at a constant frequency (e.g., 1/60 second) to compare levels (signal intensities) of reception signals combined by the combining devices 41 and the reception signal with the highest level is selected and supplied to a TV tuner 72.

By the way, since the levels of the combined reception signals are compared in the above system, the combining devices 41 are required to the number of the combined reception signal and, the scale of the apparatus is increased by just that much. The changeover scanning (switching) performed at the constant frequency causes noise to be generated. In the above system, reception signals with poor quality are leaked out to the TV tuner on the subsequent stage until the optimum signal is determined.

SUMMARY OF THE INVENTION

The present invention was conceived in consideration of the above problems and it is therefore an object thereof to provide a diversity receiving apparatus, a controlling method of a diversity receiving apparatus, and a program that can supply stable reception signals with a simple configuration.

In order to achieve the above object, according to the major aspect of the present invention there is provided a diversity receiving apparatus to which first and second reception signals received by different antennas are input, comprising one or more phase shifters that generate one or more third signals having phases different from the second reception signal based on the second reception signal; a correlation calculator that obtains a correlation between the first reception signal and each of the second reception signal and the third reception signals; a correlation comparator that selects the reception signal having the highest correlation with the first reception signal from the second reception signal and the third reception signals; a selector that selects and outputs one of the second reception signal or the third reception signals, which is selected by the correlation comparator; and a combining device that outputs a signal formed by combining the first reception signal and the reception signal output from the selector.

The diversity receiving apparatus of the present invention compares the correlations of two reception signals with different phases before combining and combines only the combination of the reception signals with the highest correlation. Therefore, only one combining device is basically needed and a diversity receiving apparatus can be realized with a simple configuration. The configuration of the diversity receiving apparatus can further be simplified by using a delaying device as a phase shifter.

Since the diversity receiving apparatus of the present invention checks the correlation of phases of the reception signals before combining rather than after combining, the optimum combination of the reception signal can be acquired highly accurately and the high-quality reception signal can be supplied to the circuit on the subsequent stage, such as a TV tuner. Since the selector is operated after determining the combination with the highest correlation, no poor-quality signals are leaked out to the circuit on the subsequent stage. Because of the fewer number of times of changeover in the selector, less noise is generated.

BRIEF DESCRIPTION OF THE DRAWINGS

To understand the present invention and the advantages thereof more thoroughly, the following description should be referenced, which is associated with the accompanying drawings.

DETAILED DESCRIPTION OF THE INVENTION

Description will hereinafter be made of a preferred embodiment of a noise canceller according to the present invention with reference to the accompanying drawings.

Figure 1:
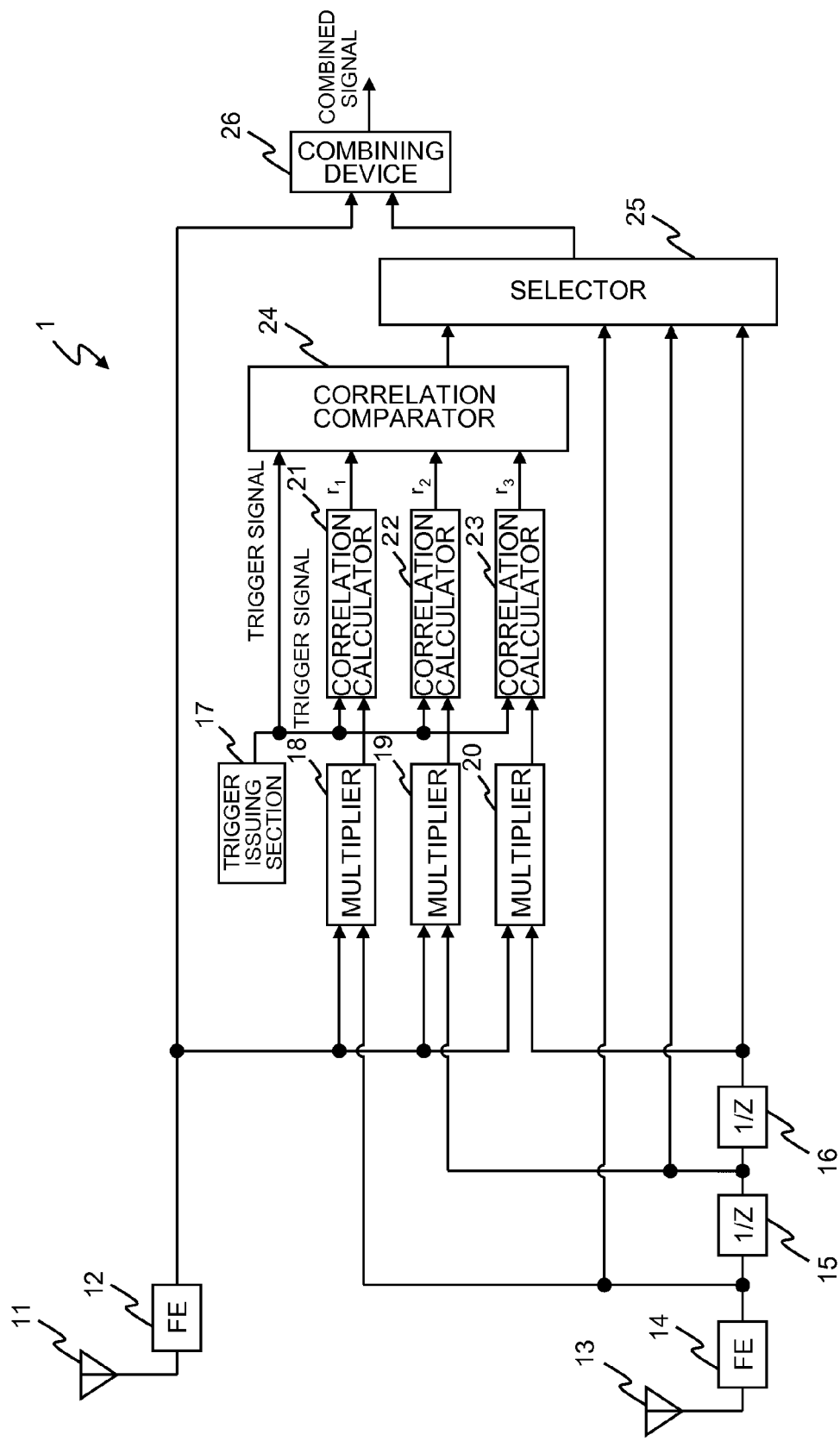
FIG. 1 is a block diagram of relevant parts of a diversity receiving apparatus 1 described for one embodiment of the present invention.

FIG. 1 shows a block diagram of relevant parts of a diversity receiving apparatus described for one embodiment of the present invention. A receiving apparatus 1 is constituted by including a first front end section 12 that amplifies a reception signal (hereinafter, first reception signal) received by a first antenna 11, a second front end section 14 that amplifies a reception signal (hereinafter, second reception signal) received by a second antenna 13, first and second phase shifters 15, 16 that change phases of reception signals, a trigger issuing section 17, first to third multipliers 18, 19, 20, first to third correlation calculators 21, 22, 23, a correlation comparator 24, a selector 25, and a combining device 26.

In the block diagram shown in FIG. 1, the first and second phase shifters 15, 16 can be, for example, an octave-band mode that uses a 90-degree hybrid transformer and a varicap diode, a frequency conversion mode that changes a phase of an output signal by changing a phase of a local oscillating frequency when a high-frequency signal is converted to an intermediate frequency and converted again to the original frequency, a PLL (Phase Lock Loop) mode that compares a phase of an input signal with a phase of an output signal or an external signal to change a phase of output signal using a delay amount within a feedback control loop, etc.

The first to third multipliers 18, 19, 20, the first to third correlation calculators 21, 22, 23, and the correlation comparator 24 are constituted by using at least one of software control with an MPU (micro Processor Unit), a process using a DSP (Digital Signal Processor), and wired logic.

The receiving apparatus 1 is applied to, for example, an on-vehicle radio tuner or TV tuner, a cellular phone, a wireless LAN, etc. and combines reception signals received with a plurality of antennas to supply the signal to an IF circuit, a detection circuit, etc. on the subsequent stage.

Specifically, the receiving apparatus 1 generates a plurality of reception signals with different phases based on a reception signal received by a certain antenna among a plurality of antennas, obtains a correlation between each of these reception signals and a reception signal received by another antenna, and combines and supplies two reception signals with the highest correlation to a circuit on the subsequent stage.

The above correlation is obtained as the Pearson's product moment correlation coefficient shown in the following equation (1), for example.

$$r = \frac{\sum_{i=1}^{n}(y_i - <y>)(x_i - <x>)}{\sqrt{\sum_{i=1}^{n}(y_i - <y>)^2(x_i - <x>)^2}} \quad (1)$$

In equation (1), r is the Pearson's product moment correlation coefficient. n is a sampling number. $x_i$ and $y_i$ are sampling values at time $t_1, t_2, \ldots t_n$ of two reception signals that are comparison targets, respectively. <x> and <y> are the average values of the sampling values of the respective reception signals.

In the following embodiments, the correlation r is obtained based on the following equation (2), which is a simplified version of the above equation.

$$r = \sum_{i=1}^{n}(Y_i \times x_i) \quad (2)$$

In the block diagram shown in FIG. 1, the first phase shifter 15 shifts a phase of a second reception signal (hereinafter, this reception signal is described as a wave function "A$_2$ (t)") output from the second front end section 14 by d to generate a third reception signal (hereinafter, this reception signal is described as a wave function "A$_2$ (t+d)"). The second phase shifter 16 further shifts the phase of the third reception signal output from the first phase shifter 15 by d to generate a third reception signal (hereinafter, this reception signal is described as a wave function "$A_2(t+2d)$").

The first multiplier 18 receives a first reception signal (hereinafter, this reception signal is described as a wave function "$A_1(t)$") output from the first front end section 12 and the second reception signal $A_2(t)$ output from the second front end section 14. The first multiplier 18 sequentially obtains values by multiplying the sampling values of respective reception signals at time t1, t2, . . . , i.e., $A_1(t_1) \times A_2(t_1)$, $A_1(t_2) \times A_2(t_2)$, . . . , which are output to the first correlation calculator 21.

The first correlation calculator 21 obtains a correlation $r_1$ between the first reception signal and the second reception signal from the following equation (3) based on the values sequentially input from the first multiplier 18 and outputs the correlation to the correlation comparator 24.

$$r_1 = \sum_{i=1}^{n} (A_1(t_i) \times A_2(t_i)) \qquad (3)$$

The second multiplier 19 receives the first reception signal output from the first front end section 12 and the third reception signal $A_2(t+d)$ output from the first phase shifter 15. The second multiplier 19 sequentially obtains values by multiplying the sampling values of respective reception signals at time t1, t2, . . . , i.e., $A_1(t_1) \times A_2(t_1+d)$, $A_1(t_2) \times A_2(t_2+d)$, . . . , which are output to the second correlation calculator 22.

The second correlation calculator 22 obtains a correlation $r_2$ between the first reception signal $A_1(t)$ and the second reception signal $A_2(t_1+d)$ from the following equation (4) based on the values sequentially input from the second multiplier 19 and outputs the correlation to the correlation comparator 24.

$$r_2 = \sum_{i=1}^{n} (A_1(t_i) \times A_2(t_i + d)) \qquad (4)$$

The third multiplier 20 receives the first reception signal $A_1(t)$ output from the first front end section 12 and the third reception signal $A_2(t+2d)$ output from the second phase shifter 16. The third multiplier 20 sequentially obtains values by multiplying the sampling values of respective reception signals at time t1, t2, . . . , i.e., $A_1(t_1) \times A_2(t_1+2d)$, $A_1(t_2) \times A_2(t_2+2d)$, . . . , which are output to the third correlation calculator 23.

The third correlation calculator 23 obtains a correlation $r_3$ between the first reception signal $A_1(t)$ and the third reception signal $A_2(t_1+2d)$ from the following equation (5) based on the values sequentially input from the third multiplier 20 and outputs the correlation to the correlation comparator 24.

$$r_3 = \sum_{i=1}^{n} (A_1(t_i) \times A_2(t_i + 2d)) \qquad (5)$$

The correlation comparator 24 compares the correlation $r_1$, the correlation $r_2$, and the correlation $r_3$, output from the first to third correlation calculators 21, 22, 23 to select the reception signal having the highest correlation with the first reception signal $A_1(t)$ from the second reception signal $A_2(t)$, the third reception signal $A_2(t+d)$, and the third reception signal $A_2(t+2d)$. The selector 25 selects and outputs the reception signal selected by the correlation comparator 24 to the combining device 26.

The combining device 26 receives the first reception signal $A_1(t)$ input from the first front end section 12 and one of the second reception signal $A_2(t)$, the third reception signal $A_2(t+d)$, and the third reception signal $A_2(t+2d)$ input from the selector 25, and outputs a signal acquired by combining the two input signals to a circuit on the subsequent stage.

The trigger issuing section 17 issues a trigger signal that controls the timing of each process described above.

Figure 2:
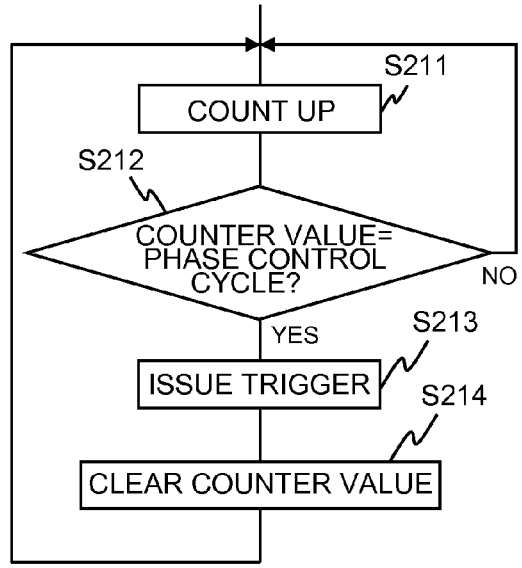
FIG. 2 is a flowchart describing a process of a trigger issuing section 17 described for one embodiment of the present invention.

FIG. 2 is a flowchart describing the process of the trigger issuing section 17. The trigger issuing section 17 includes a counter and a clock generator. The trigger issuing section 17 counts up the counter value every time a pulse of a clock signal is input which is output from the clock generator (S211). The trigger issuing unit 17 includes a memory to store a phase control cycle. The trigger issuing section 17 compares the counter value with the phase control cycle every time the counter value is counted up (S212). If the counter value matches with the phase control cycle (S212: YES), the trigger issuing section 17 outputs the trigger signal to the first to third correlation calculators 21, 22, 23, and the correlation comparator 24 (S214).

With the above arrangement, the trigger signal is input to the first to third correlation calculators 21, 22, 23, and the correlation comparator 24 for each phase control cycle. As described later, the timing of the process is controlled by the trigger signal input for each phase control cycle in the first to third correlation calculators 21, 22, 23, and the correlation comparator 24. Therefore, for example, by setting the phase control cycle depending on the performance of the hardware such as the MPU, DSP, and wire logic that realize the first to third correlation calculators 21, 22, 23, and the correlation comparator 24, the timing of the issuance of the trigger signal can be adjusted such that the maximum quality can be acquired in the combined signal output from the combining device 26.

Figure 3A:
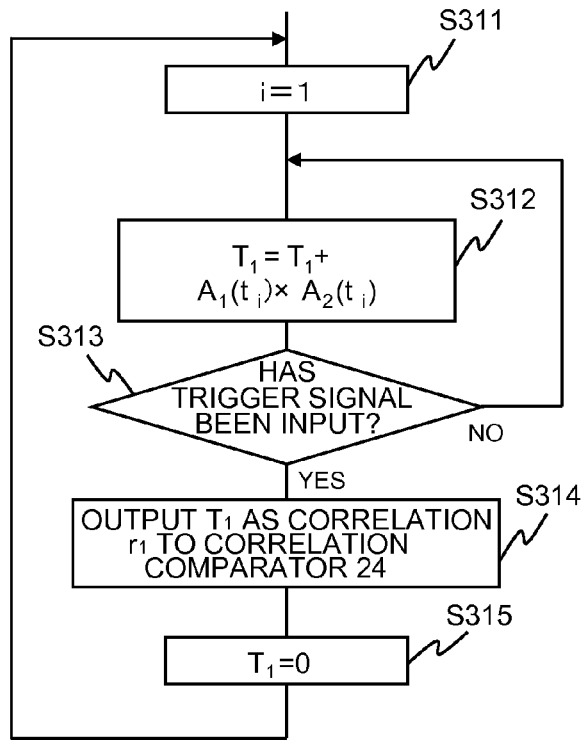
FIG. 3A is a flowchart describing a process of a first multiplier 18 and a first correlation calculator 21 described for one embodiment of the present invention.

FIG. 3A is a flowchart describing the process of the first multiplier 18 and the first correlation calculator 21. In the process at S311, a value of i is initialized (S311). In the process at S312, as shown in the following equation (6), the value of $A_1(t_i) \times A_2(t_i)$ is added to an accumulation value $T_1$ (S312).

$$T_1 = T_1 + A_1(t_i) \times A_2(t_i) \ (I=1, 2 \ldots n) \qquad (6)$$

In equation (6), n is intervals of the input of the trigger signal, i.e., the sampling number determined depending on the phase control cycle.

In the next process at S313, the first correlation calculator 21 checks whether the trigger signal has been input or not (S313). If the trigger signal has not been input (S313, NO), the process at S312 is repeated. On the other hand, if the trigger signal has been input (S313, YES), the value of the current accumulation value $T_1$ is output as the correlation $r_1$ to the correlation comparator 24 (S314).

At S315, the accumulation value $T_1$ is initialized to start the calculations until the next trigger signal is input (S315).

Figure 3B:
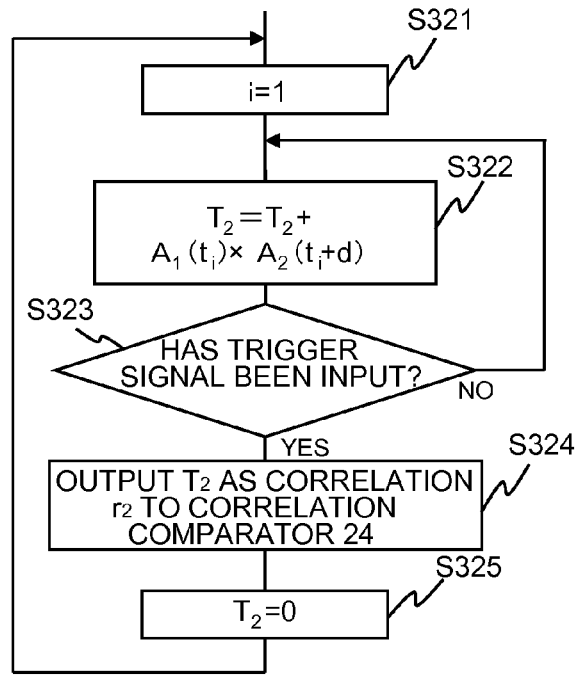
FIG. 3B is a flowchart describing a process of a second multiplier 19 and a second correlation calculator 22 described for one embodiment of the present invention.

FIG. 3B is a flowchart describing the process of the second multiplier 19 and the second correlation calculator 22. In the process at S321, a value of i is initialized (S321). In the process at S322, as shown in the following equation (7), the value of $A_1(t_i) \times A_2(t_i+d)$ is added to an accumulation value $T_2$ (S322).

$$T_2 = T_2 + A_1(t_i) \times A_2(t_i+d) \ (I=1, 2 \ldots n) \qquad (7)$$

In equation (7), n is intervals of the input of the trigger signal from the trigger issuing section 17, i.e., the sampling number determined depending on the phase control cycle.

In the process at S323, the second correlation calculator 22 checks whether the trigger signal has been input or not (S323). If the trigger signal has not been input (S323, NO), the process at S322 is repeated. If the trigger signal has been input (S323, YES), the value of the current accumulation value $T_2$ is output as the correlation $r_2$ to the correlation comparator 24 (S324).

In the process at S325, the accumulation value $T_2$ is initialized for the next calculation (S325).

Figure 3C:
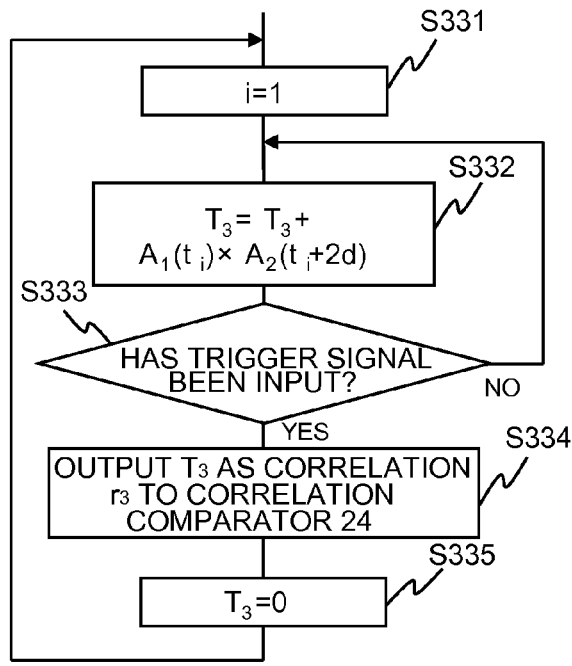
FIG. 3C is a flowchart describing a process of a third multiplier 20 and a third correlation calculator 23 described for one embodiment of the present invention.

FIG. 3C is a flowchart describing the process of the third multiplier 20 and the third correlation calculator 23. In the process at S331, a value of i is initialized (S331). In the process at S332, as shown in the following equation (8), the value of $A_1(t_i) \times A_2(t_i+2d)$ is added to an accumulation value $T_3$ (S332).

$$T_3 = T_3 + A_1(t_i) \times A_2(t_i+2d) \ (I=1, 2 \ldots n) \tag{8}$$

In equation (8), n is intervals of the input of the trigger signal, i.e., the sampling number determined depending on the phase control cycle.

In the process at S333, the third correlation calculator 23 checks whether the trigger signal has been input or not (S333). If the trigger signal has not been input (S333, NO), the process at S332 is repeated. If the trigger signal has been input (S333, YES), the value of the current accumulation value $T_3$ is output as the correlation $r_3$ to the correlation comparator 24 (S334). In the process at S335, the accumulation value $T_3$ is initialized for the next calculation (S335).

Figure 4:
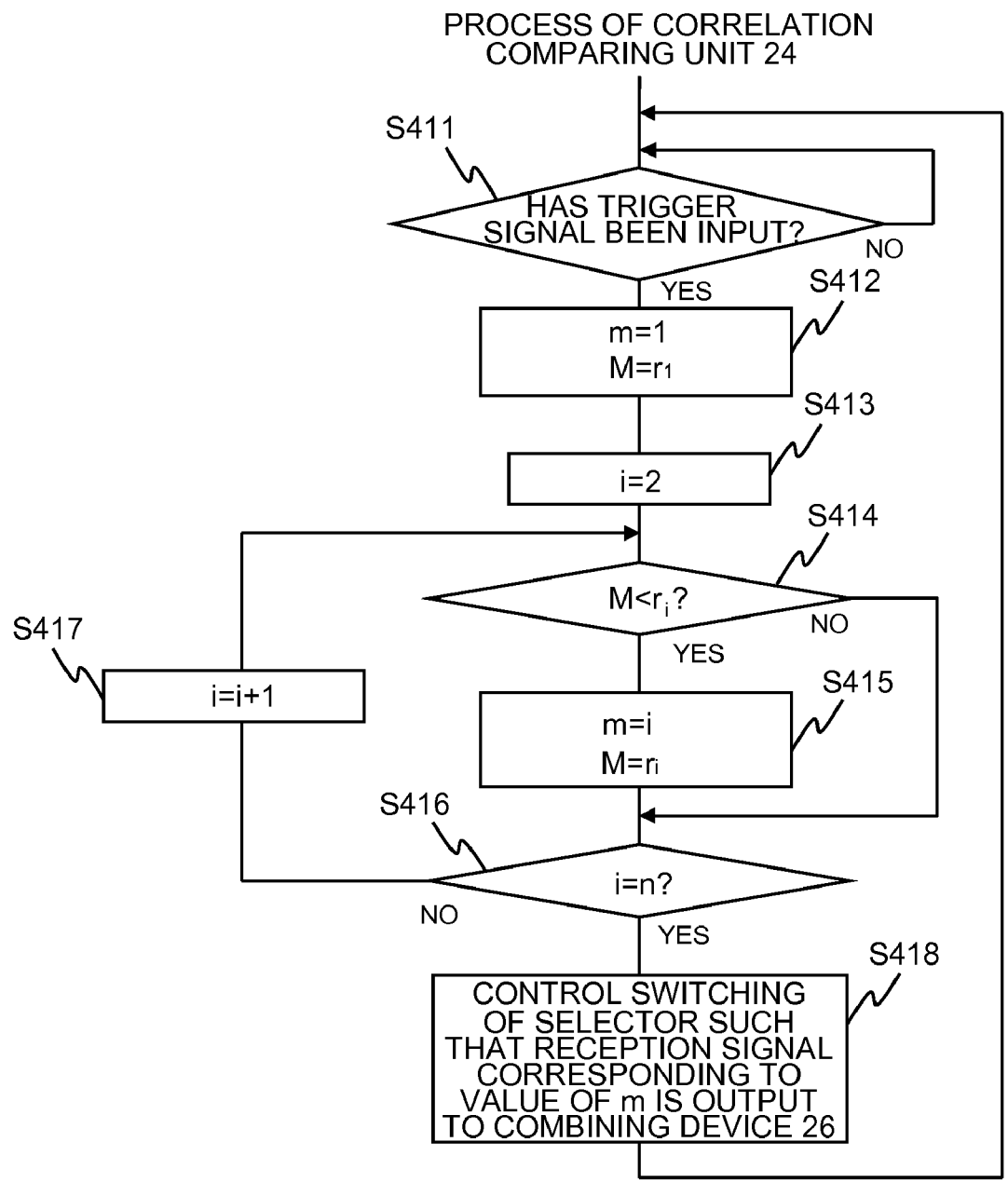
FIG. 4 is a flowchart describing a process of a correlation comparator 24 described for one embodiment of the present invention.

FIG. 4 is a flowchart describing the process of the correlation comparator 24. In the process at S411, it is checked whether the trigger signal has been input or not (S411). In the next process at S412, a variable m is set to one and a value of a variable M is set to the correlation $r_1$ (S412). In the process at S413, i is set to two (S413). In the process at S414, M is compared with the correlation $r_1$. If the correlation $r_1$ is greater than M (S414, YES), the value of m is set to i and the value of M is set to the correlation $r_1$ (S415). If the correlation $r_1$ is not greater than M (S414, No), the procedure goes to the process at step S416.

In the process at S416, it is checked whether i is identical to n or not (S416). If not identical (S416, NO), the procedure goes to the process at step S417. In the next process at S417, one is added to the value of i. If i is identical to n in the process at S416 (S416, YES), the procedure goes to the process at step S418.

In the process at S418, the selector 25 performs control so as to output to the combining device 26 the reception signal corresponding to the value of m (i.e., the second reception signal when M=1, the third reception signal when M=2, and the fourth reception signal when M=3) (S418).

Figure 5A:
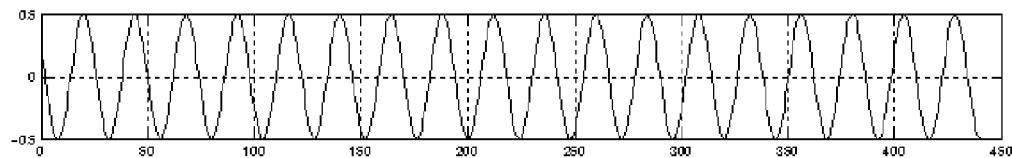
FIG. 5A shows a waveform of a first reception signal $A_1(t)$ output from a first front end section 12 described for one embodiment of the present invention.
Figure 5B:
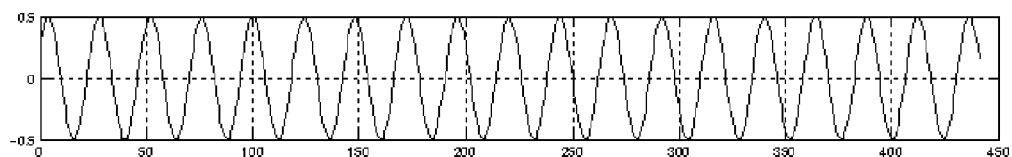
FIG. 5B shows a waveform of a second reception signal $A_2(t)$ output from a second front end section 14 described for one embodiment of the present invention.

An example will be shown of a waveform at each point of the receiving apparatus 1 shown in FIG. 1 when a reception signal composed of a waveform shown in FIG. 5A is output as the first reception signal $A_1(t)$ from the first front end section 12 and a reception signal composed of a waveform shown in FIG. 5B is output as the second reception signal $A_2(t)$ from the second front end section 14. In each graph shown in FIGS. 5A to 5P, the vertical axis is an amplitude level, and the horizontal axis is the sampling number (sampling frequency=5.6448 MHz).

Figure 5C:
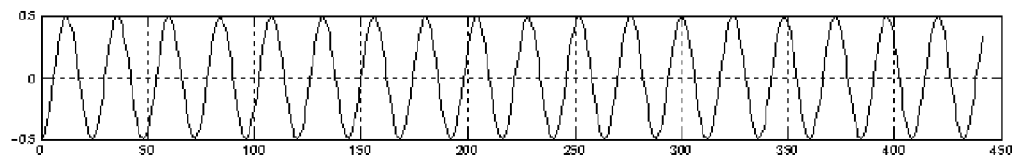
FIG. 5C shows a waveform of a third reception signal $A_2(t+d)$ output from a first phase shifter 15 described for one embodiment of the present invention.
Figure 5D:
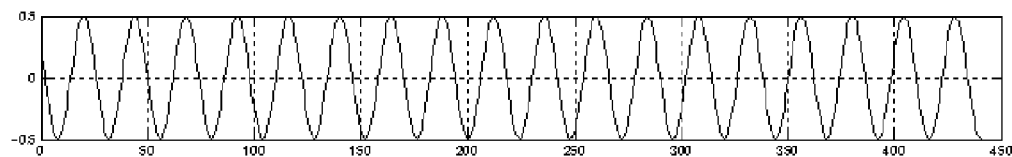
FIG. 5D shows a waveform of a third reception signal A$_2$ (t+2d) output from a second phase shifter 16 described for one embodiment of the present invention.

FIG. 5C is the waveform of the third reception signal $A_2(t+d)$ output from the first phase shifter 15. FIG. 5D is the waveform of the third reception signal $A_2(t+2d)$ output from the second phase shifter 16. The shift amount is 120 degrees in each of the first phase shifter 15 and the second phase shifter 16.

Figure 5E:
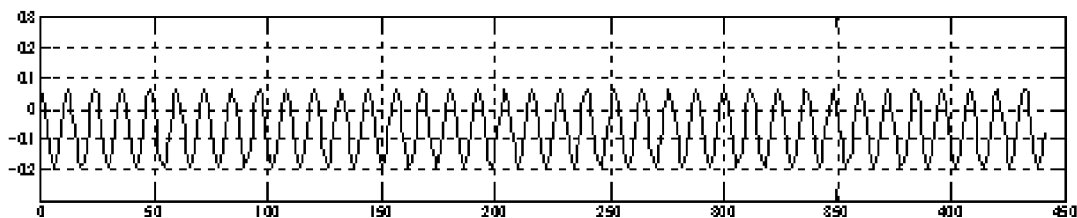
FIG. 5E shows a waveform of a signal output from the first multiplier 18 when the signals with the waveforms shown in FIGS. 5A and 5B are input, described for one embodiment of the present invention.
Figure 5F:
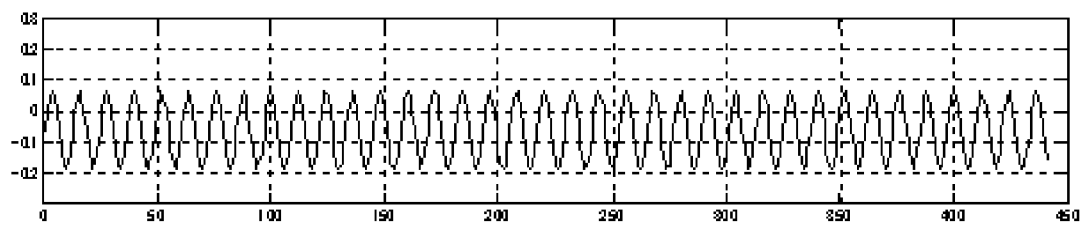
FIG. 5F shows a waveform of a signal output from the second multiplier 19 when the signals with the waveforms shown in FIGS. 5A and 5C are input, described for one embodiment of the present invention.

FIG. 5E is a waveform of a signal output from the first multiplier 18 when the signals with the waveforms shown in FIGS. 5A and 5B are input. FIG. 5F is a waveform of a signal output from the second multiplier 19 when the signals with the waveforms shown in FIGS. 5A and 5C are input.

Figure 5G:
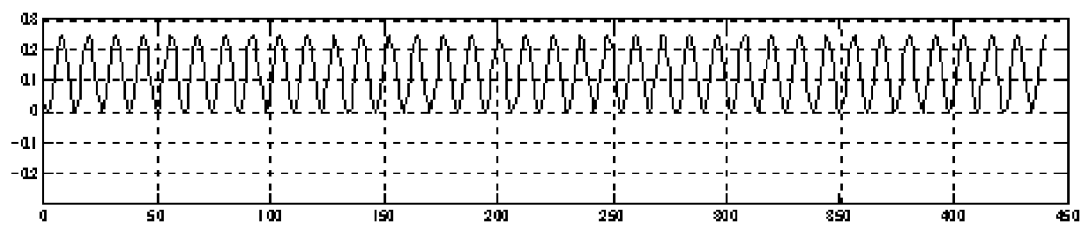
FIG. 5G shows a waveform of a signal output from the third multiplier 20 when the signals with the waveforms shown in FIGS. 5A and 5D are input, described for one embodiment of the present invention.

FIG. 5G is a waveform of a signal output from the third multiplier 20 when the signals with the waveforms shown in FIGS. 5A and 5D are input.

Figure 5H:
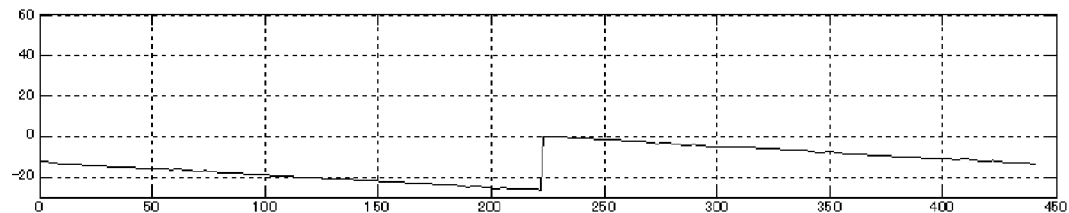
FIG. 5H shows a waveform of an accumulation value T$_1$ calculated in the first correlation calculator 21 based on the signal shown in FIG. 5E, described for one embodiment of the present invention.
Figure 5I:
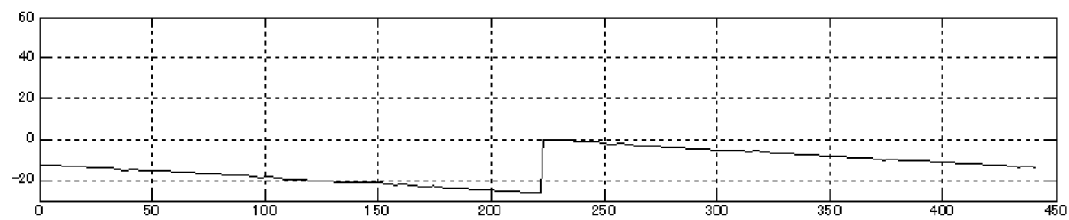
FIG. 5I shows a waveform of an accumulation value T$_2$ calculated in the second correlation calculator 22 based on the signal shown in FIG. 5F, described for one embodiment of the present invention.
Figure 5J:
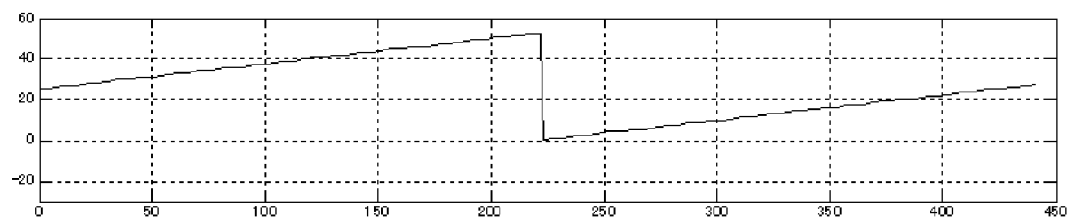
FIG. 5J shows a waveform of an accumulation value T$_3$ calculated in the third correlation calculator 23 based on the signal shown in FIG. 5G, described for one embodiment of the present invention.

FIG. 5H is the waveform of the accumulation value $T_1$ calculated in the first correlation calculator 21 based on the signal shown in FIG. 5E. FIG. 5I is the waveform of the accumulation value $T_2$ calculated in the second correlation calculator 22 based on the signal shown in FIG. 5F. FIG. 5J is the waveform of the accumulation value $T_3$ calculated in the third correlation calculator 23 based on the signal shown in FIG. 5G. As shown in FIGS. 5H to 5J, the trigger signal is input near 225 on the horizontal axis from the trigger issuing section 17 to the first to third correlation calculators 21, 22, 23. That is, the accumulation values $T_1$, $T_2$, and $T_3$ immediately before the rising or falling edge at 225 on the horizontal axis are input into the correlation comparator 24 as the correlations $r_1$, $r_2$, and $r_3$, respectively.

Figure 5K:
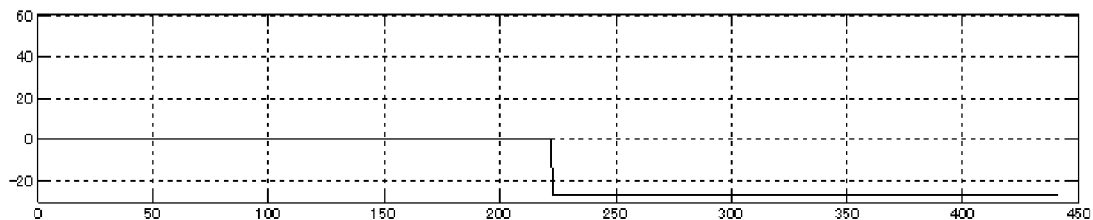
FIG. 5K shows a waveform of a signal corresponding to a correlation r$_1$ input into the correlation comparator 24 described for one embodiment of the present invention.
Figure 5L:
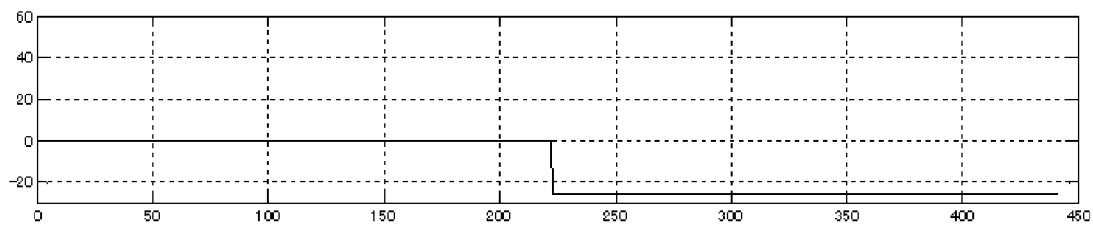
FIG. 5L shows a waveform of a signal corresponding to a correlation r$_2$ input into the correlation comparator 24 described for one embodiment of the present invention.
Figure 5M:
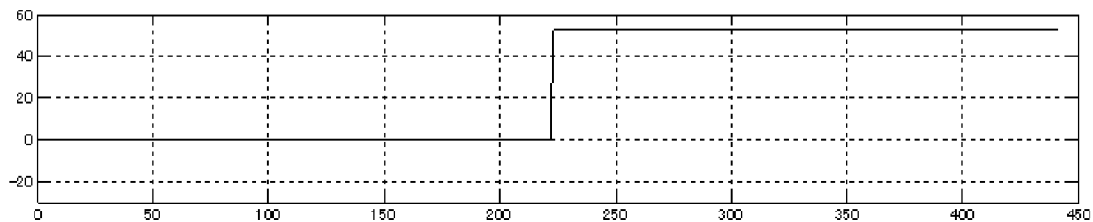
FIG. 5M shows a waveform of a signal corresponding to a correlation r$_3$ input into the correlation comparator 24 described for one embodiment of the present invention.

FIGS. 5K to 5M are the waveforms of the signals input into the correlation comparator 24. In this example, the correlations of $r_1=-27$, $r_2=-26$, and $r_3=51$ are input into the correlation comparator 24. In this example, the initial values of the correlations $r_1$, $r_2$, and $r_3$ are set to zero. The selector 25 operates so as to input the combination of the reception signals corresponding to the correlation $r_3$ having the largest value into the combining device 26. In this example, the selector 25 operates so as to input into the combining device 26 the third reception signal $A_2(t+2d)$ output from the second phase shifter 15.

Figure 5N:
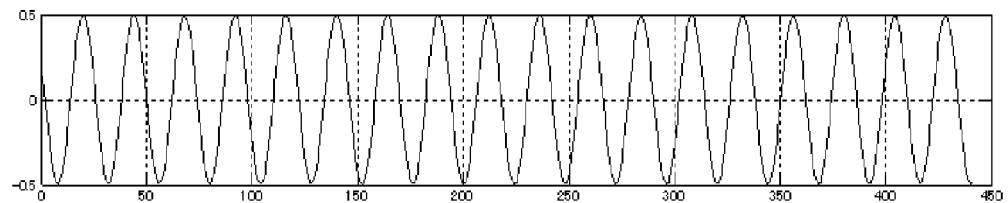
FIG. 5N shows a waveform of a first reception signal A$_1$ (t) input into a combining device 26 described for one embodiment of the present invention.
Figure 5O:
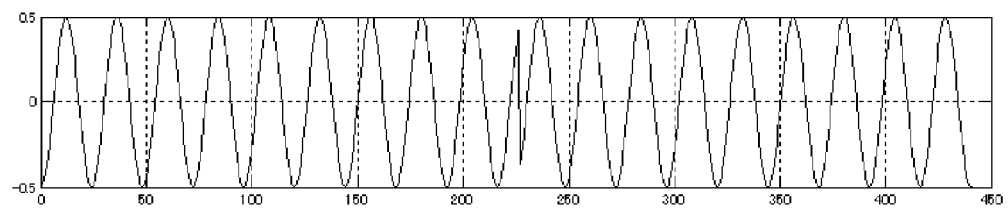
FIG. 5O shows a waveform of a third reception signal A$_2$ (t+2d) output from the second phase shifter 16, which is a waveform of a signal input from a selector 25 to the combining device 26, described for one embodiment of the present invention.
Figure 5P:
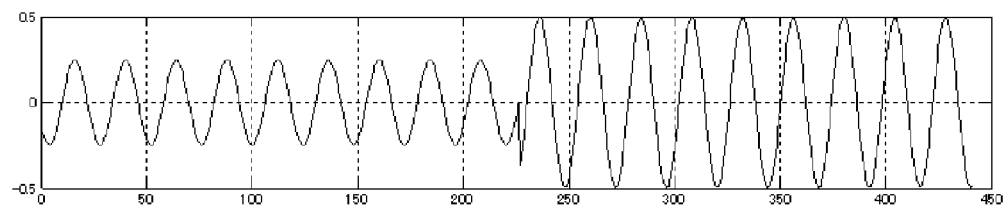
FIG. 5P shows a waveform input into a circuit on the subsequent stage, which is a waveform of a signal output from the combining device 26, described for one embodiment of the present invention.
Figure 6:
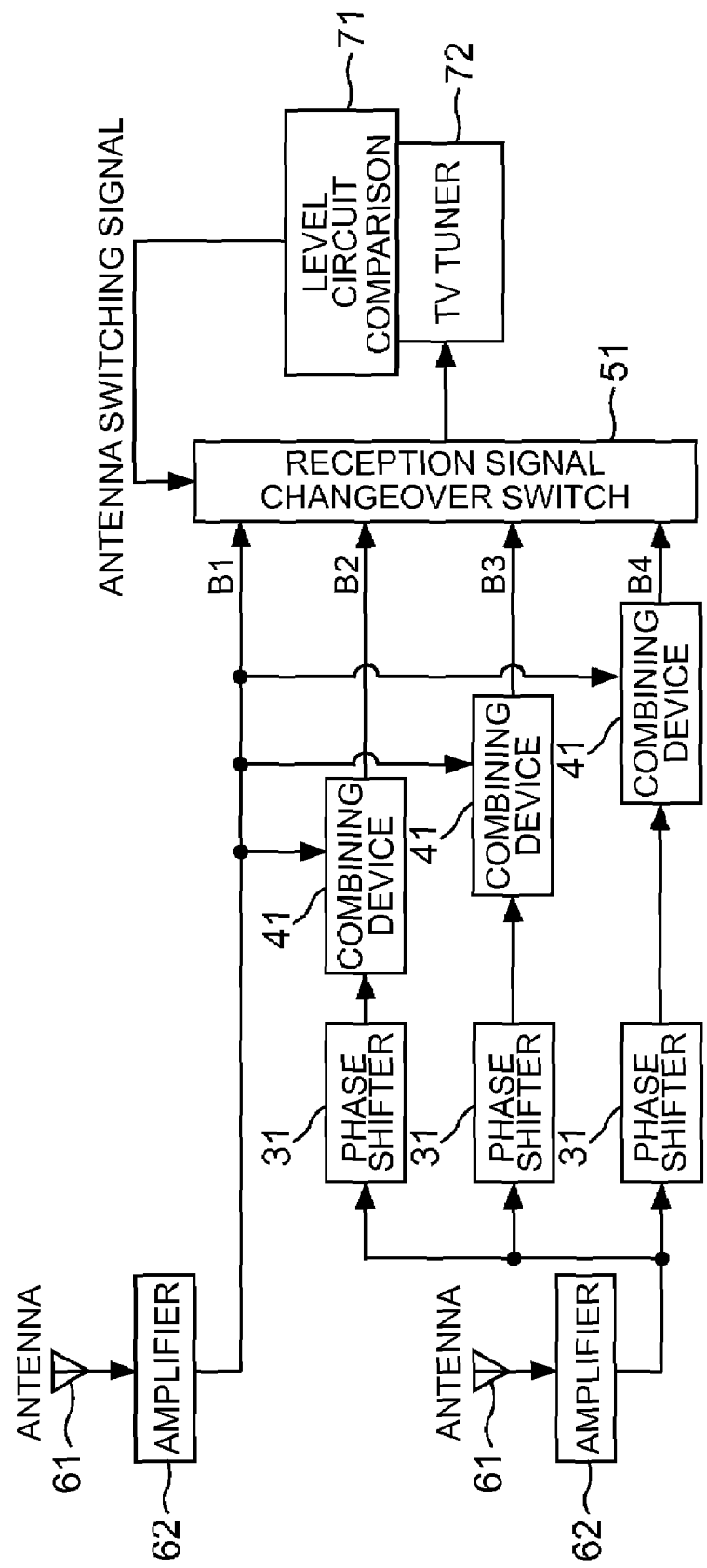
FIG. 6 is a block diagram of an on-vehicle TV diversity system disclosed in Japanese Patent Application Laid-Open Publication No. 2000-252895.

FIG. 5N is a waveform of the first reception signal $A_1(t)$ input into the combining device 26 (same waveform as FIG. 5A). FIG. 5O shows a waveform of the third reception signal $A_2(t+2d)$ output from the second phase shifter 16, which is the waveform of the signal input from the selector 25 to the combining device 26. In FIG. 5O, before the time point of the input of the trigger signal (near 225 on the horizontal axis), the waveform is a default waveform $A_2(t)$. FIG. 5P shows the waveform input into the circuit on the subsequent stage, which is the waveform of the signal output from the combining device 26.

In this example, the trigger signal is input near 225 on the horizontal axis and the waveform output from the combining device 26 is switched in a synchronized manner. As shown in FIG. 5P, the amplitude of the waveform output from the combining device 26 is increased after the switching is performed. In this way, the waveform of the reception signal has been improved by combining the first reception signal $A_1(t)$ and the third reception signal $A_2(t+2d)$.

Although the preferred specific example of the present invention has been described as above, it should be understood that various changes and alternatives may be achieved without impairing the spirit and the scope of the present invention defined by appended claims.

The degree of the correlation can also be determined by a method other than the Pearson's product moment correlation coefficient. For example, the correlation can be determined by obtaining a sum of the signal intensities at each time and adding up the sums to obtain a value.

Although two reception signals with different phases are generated in the above embodiment, the receiving apparatus outputting a higher-quality reception signal can be configured by increasing the numbers of the phase shifters, the multipliers, and the correlation calculators.

Although the phase is shifted evenly by d with each phase shifter in the above embodiment, the setting of the shift amount is not limited as long as all the phases of the second to third reception signals are different.

Although the multipliers 18, 19, 20 and the correlation calculators 21, 22, 23 are separated in the above embodiment for convenience of description, the multipliers 18, 19, 20 may be portions of the functions of the corresponding correlation calculators 21, 22, 23, respectively.

What is claimed is:

1. A diversity receiving apparatus to which first and second reception signals received by different antennas are input, comprising:
    one or more phase shifters that generate one or more third signals having phases different from the second reception signal based on the second reception signal;
    a correlation calculator that obtains a correlation between the first reception signal and each of the second reception signal and the third reception signals;
    a correlation comparator that selects the reception signal having the highest correlation with the first reception signal from the second reception signal and the third reception signals;
    a selector that selects and outputs one of the second reception signal or the third reception signals, based on an output of the correlation comparator;
    a combining device that outputs a signal formed by combining the first reception signal and the reception signal output from the selector; and
    a trigger issuing section that issues a trigger signal at predetermined time intervals,
    wherein the correlation calculator obtains the correlation between the first reception signal and each of the second reception signal and the third reception signals every time the trigger signal is issued, and
    wherein the correlation comparator selects the reception signal having the highest correlation with the first reception signal from the second reception signal and the third reception signals every time the trigger signal is issued.

2. The diversity receiving apparatus of claim 1,
    wherein the correlation calculator obtains the correlation by substituting a sampling value of the first reception signal and a sampling value of the second reception signal or the third reception signals for the Pearson's product moment correlation coefficient formula.

3. The diversity receiving apparatus of claim 1,
    wherein the phase shifter is constituted by a delaying device.

4. The diversity receiving apparatus of claim 1, comprising:
    a first front end section that amplifies and supplies the first reception signal to the correlation calculator and the combining device; and
    a second front end section that amplifies and supplies the second reception signal to the correlation calculator and the combining device.

5. The diversity receiving apparatus of claim 1,
    wherein the correlation calculator or the correlation comparator is realized by at least one of software control with an MPU, a process using a DSP, or wired logic.

6. A controlling method of a diversity receiving apparatus to which first and second reception signals received by different antennas are input, comprising the steps of:
    using one or more phase shifters to generate one or more third signals having phases different from the second reception signal based on the second reception signal;
    issuing a trigger signal at predetermined time intervals;
    obtaining a correlation between the first reception signal and each of the second reception signal and the third reception signals;
    selecting the reception signal having the highest correlation with the first reception signal from the second reception signal and the third reception signals;
    selecting and outputting the selected one of the second reception signal or the third reception signals; and
    outputting a signal formed by combining the first reception signal and the output reception signal,
    wherein obtaining the correlation between the first reception signal and each of the second reception signal and the third reception signals and selecting the reception signal having the highest correlation with the first reception signal from the second reception signal and the third reception signals are performed every time the trigger signal is issued.

7. A computer-readable medium containing a program used in the diversity receiving apparatus of claim 1, the program realizing the functions of:
    obtaining a correlation between the first reception signal and each of the second reception signal and the third reception signals, which is performed by the correlation calculator; and
    selecting the reception signal having the highest correlation with the first reception signal from the second reception signal and the third reception signals, which is performed by the correlation comparator.

* * * * *